United States Patent
Abe

(10) Patent No.: US 7,610,974 B2
(45) Date of Patent: Nov. 3, 2009

(54) HYBRID VEHICLE AND CONTROL METHOD OF HYBRID VEHICLE

(75) Inventor: Tetsuya Abe, Toyota (JP)

(73) Assignee: Toyota Jidosha Kabushiki Kaisha, Tokyo (JP)

(*) Notice: Subject to any disclaimer, the term of this patent is extended or adjusted under 35 U.S.C. 154(b) by 124 days.

(21) Appl. No.: 11/792,694

(22) PCT Filed: Jan. 30, 2006

(86) PCT No.: PCT/JP2006/001904

§ 371 (c)(1),
(2), (4) Date: Jun. 8, 2007

(87) PCT Pub. No.: WO2006/080570

PCT Pub. Date: Aug. 3, 2006

(65) Prior Publication Data

US 2008/0105477 A1    May 8, 2008

(30) Foreign Application Priority Data

Jan. 31, 2005   (JP)   ............................. 2005-022993

(51) Int. Cl.
*B60K 6/20* (2007.10)

(52) U.S. Cl. .................. 180/65.21; 180/65.28; 903/903

(58) Field of Classification Search ............... 180/65.2, 180/65.3, 65.4, 65.6, 65.8, 65.21, 65.225, 180/65.265, 65.27, 65.28, 65.285; 903/903, 903/905, 907; 477/46, 5, 3, 94; 701/22, 701/102, 84

See application file for complete search history.

(56) References Cited

U.S. PATENT DOCUMENTS

| | | | |
|---|---|---|---|
| 5,789,881 A | * | 8/1998 | Egami et al. ............... 180/65.4 |
| 5,791,427 A | | 8/1998 | Yamaguchi |
| 5,839,533 A | | 11/1998 | Mikami et al. |
| 5,898,282 A | * | 4/1999 | Drozdz et al. .............. 180/65.4 |
| 6,009,365 A | | 12/1999 | Takahara et al. |
| 6,018,694 A | * | 1/2000 | Egami et al. ................ 701/102 |
| 6,019,698 A | * | 2/2000 | Lawrie et al. ................. 477/5 |
| 6,067,801 A | * | 5/2000 | Harada et al. .............. 903/903 |
| 6,090,007 A | * | 7/2000 | Nakajima et al. ............ 477/46 |
| 6,116,363 A | * | 9/2000 | Frank ........................ 180/65.2 |

(Continued)

FOREIGN PATENT DOCUMENTS

EP          0 800 949 A2    10/1997

(Continued)

*Primary Examiner*—Hau V Phan
(74) *Attorney, Agent, or Firm*—Oliff & Berridge, PLC

(57) ABSTRACT

In a hybrid vehicle where an engine, a first motor, and a driveshaft are all connected to a planetary gear mechanism and the driveshaft is further linked to a second motor, when a battery is in an unchargeable state in the release of both an accelerator and a brake (step S130), a throttle opening TH* and a valve timing VVT* for air intake and exhaust are set to increase a pumping loss of the engine with an increase in absolute value of a braking power demand, which is to be output to the driveshaft (step S170). The engine is controlled with the throttle opening TH* and the valve timing VVT*, while the second motor is under regenerative control to generate electric power. The first motor used for motoring of the engine is then controlled to consume the electric power generated by the regenerative control of the second motor.

11 Claims, 8 Drawing Sheets

U.S. PATENT DOCUMENTS

| | | | |
|---|---|---|---|
| 6,190,282 B1 * | 2/2001 | Deguchi et al. | 477/5 |
| 6,253,127 B1 * | 6/2001 | Itoyama et al. | 701/22 |
| 6,287,237 B1 * | 9/2001 | Graf et al. | 477/94 |
| 6,898,506 B2 * | 5/2005 | Kawai et al. | 701/84 |

FOREIGN PATENT DOCUMENTS

| | | |
|---|---|---|
| EP | 0 925 980 A2 | 6/1999 |
| FR | 2 803 253 | 7/2001 |
| GB | A 2 391 325 | 2/2004 |
| JP | A 10-002239 | 1/1998 |
| JP | A 10-023603 | 1/1998 |
| JP | A 11-093724 | 4/1999 |
| JP | A-11-191903 | 7/1999 |
| JP | B2 3050138 | 3/2000 |
| JP | A 2000-291451 | 10/2000 |
| JP | A-2001-294056 | 10/2001 |
| JP | A 2001-309504 | 11/2001 |
| JP | A-2002-337573 | 11/2002 |
| JP | A 2003-264904 | 9/2003 |
| JP | A 2004-516413 | 6/2004 |
| JP | A 2004-225564 | 8/2004 |
| JP | A 2004-312962 | 11/2004 |
| JP | A-2004-346811 | 12/2004 |
| JP | A 2004-360672 | 12/2004 |

* cited by examiner

HYBRID VEHICLE AND CONTROL METHOD OF HYBRID VEHICLE

TECHNICAL FIELD

The present invention relates to a hybrid vehicle and a control method of the hybrid vehicle.

BACKGROUND ART

A proposed hybrid vehicle is equipped with an engine, a generator, a power distribution mechanism as a planetary gear mechanism connected to the engine, the generator, and a driveshaft, a motor inputting and outputting power from and to drive wheels, and a battery inputting and outputting electric power from and to the generator and the motor (see, for example, Japanese Patent Laid-Open Gazette No. 2004-225564). The hybrid vehicle sets a regenerative power demand of the motor according to the state of charge of the battery, in response to the driver's release of an accelerator pedal and depression of a brake pedal. The hybrid vehicle regulates the throttle opening and the valve timing of an air intake valve to adjust the pumping loss of the engine. The adjustment of the pumping loss causes the engine to output a braking force, which is subtraction of the regenerative power demand and a hydraulic braking force demand of a hydraulic brake attached to the drive wheels from a braking force demand. Such control of the hybrid vehicle attains regenerative power generation of the motor according to the state of charge of the battery and thus effectively satisfies the braking force demand without an excess or a deficiency.

DISCLOSURE OF THE INVENTION

This prior art hybrid vehicle satisfies the braking force demand in the state of the released accelerator pedal and the depressed brake pedal but does not consider satisfaction of the braking force demand in the released state of both the accelerator pedal and the brake pedal. In a hybrid vehicle allowing the driver to select a desired gearshift position among multiple available gearshift positions including a drive position and a brake position, adequate control is essential to satisfying the braking force demand corresponding to the selected gearshift position.

The hybrid vehicle of the invention and the control method of the hybrid vehicle thus aim to eliminate the drawbacks of the prior art and to satisfy a braking force demand by regenerative control of a driving motor even when an accumulator unit is in an unchargeable state at a timing of the braking force demand by release of both an accelerator and a brake. The hybrid vehicle of the invention and the control method of the hybrid vehicle also aim to satisfy a braking force demand in response to the driver's gearshift operation in a released state of both an accelerator and a brake.

In order to attain at least part of the above and the other related objects, the hybrid vehicle of the invention and the control method of the hybrid vehicle have the configurations discussed below.

The present invention is directed to a hybrid vehicle including: an internal combustion engine that is rotatable independently of a driving state of the hybrid vehicle; a rotational resistance adjustment structure that adjusts a rotational resistance of the internal combustion engine; an engine-starting motor that is driven for motoring of the internal combustion engine; an accumulator unit that is chargeable and dischargeable; a driving motor that has power generation capability and inputs and outputs driving power through transmission of electric power to and from at least one of the engine-starting motor and the accumulator unit; and an accelerator-brake-released state control module that, when the accumulator unit is in an unchargeable state at a timing of a braking force demand by release of both an accelerator and a brake, controls the rotational resistance adjustment structure to adjust the rotational resistance of the internal combustion engine according to the braking force demand, controls the driving motor to drive the hybrid vehicle with a braking force equivalent to the braking force demand, and controls the engine-starting motor to consume regenerative electric power generated by the driving motor.

When the accumulator unit is in the unchargeable state at the timing of the braking force demand by the release of both the accelerator and the brake, the hybrid vehicle of the invention controls the rotational resistance adjustment structure to adjust the rotational resistance of the internal combustion engine according to the braking force demand, controls the driving motor to drive the hybrid vehicle with a braking force equivalent to the braking force demand, and controls the engine-starting motor to consume the regenerative electric power generated by the driving motor. This arrangement effectively satisfies the braking force demand by regenerative control of the driving motor even when the accumulator unit is in the unchargeable state at the timing of the braking force demand by the release of both the accelerator and the brake.

In the hybrid vehicle of the invention, the rotational resistance adjustment structure may regulate a throttle opening to adjust the rotational resistance of the internal combustion engine.

In the hybrid vehicle of the invention, the rotational resistance adjustment structure may regulate an air intake-exhaust timing to adjust the rotational resistance of the internal combustion engine.

In one preferable application of the hybrid vehicle of the invention, when the accumulator unit is in the unchargeable state at the timing of the braking force demand, the accelerator-brake-released state control module controls the rotational resistance adjustment structure to increase the rotational resistance of the internal combustion engine with an increase in braking force demand. This preferable arrangement enables the electric power generated by the regenerative control of the driving motor to be effectively consumed in the process of motoring of the internal combustion engine by the engine-starting motor.

In one preferable embodiment of the invention, the hybrid vehicle further includes a gearshift position setting module that, in response to a driver's operation, selects and sets one gearshift position among multiple available gearshift positions, which require multiple different levels of braking force in the release of the accelerator and the brake. When the accumulator unit is in the unchargeable state at the timing of the braking force demand, the accelerator-brake-released state control module controls the rotational resistance adjustment structure to adjust the rotational resistance of the internal combustion engine corresponding to the selected gearshift position. This arrangement effectively satisfies the braking force demand in response to the driver's gearshift operation in the released state of both the accelerator and the brake. In this preferable embodiment, the accelerator-brake-released state control module may control the rotational resistance adjustment structure to increase the rotational resistance of the internal combustion engine in response to selection and setting of a gearshift position requiring a higher level of braking force among the multiple available gearshift positions.

In another preferable embodiment of the invention, the hybrid vehicle further includes a gearshift position setting module that, in response to a driver's operation, selects and sets one gearshift position among multiple available gearshift positions, where the multiple available gearshift positions include a drive position requiring a first braking force as the braking force demand in the release of both the accelerator and the brake and a brake position requiring a second braking force, which is greater than the first braking force, as the braking force demand in the release of both the accelerator and the brake. When the accumulator unit is in the unchargeable state at the timing of the braking force demand, the accelerator-brake-released state control module controls the rotational resistance adjustment structure to adjust the rotational resistance of the internal combustion engine to a first rotational resistance in response to selection and setting of the drive position as the selected gearshift position, while controlling the rotational resistance adjustment structure to adjust the rotational resistance of the internal combustion engine to a second rotational resistance, which is higher than the first rotational resistance, in response to selection and setting of the brake position as the selected gearshift position. This arrangement also effectively satisfies the braking force demand in response to the driver's gearshift operation in the released state of both the accelerator and the brake.

The hybrid vehicle of the invention may be driven by directly utilizing part of the output power of the internal combustion engine. The 'output power of the internal combustion engine' includes the braking force by the rotational resistance of the internal combustion engine. In this embodiment, the hybrid vehicle may further include: a three shaft-type power input output assembly that is linked to three shafts, an output shaft of the internal combustion engine, a rotating shaft of the engine-starting motor, and a drive shaft linked with an axle of the hybrid vehicle, and automatically inputs and outputs power from and to a residual one shaft based on powers input from and output to any two shafts among the three shafts. The engine-starting motor may be a pair-rotor motor having a first rotor that is connected to the output shaft of the internal combustion engine and a second rotor that is connected to the driveshaft linked with the axle of the hybrid vehicle and rotates relative to the first rotor through an electromagnetic function.

The present invention is directed to a control method of a hybrid vehicle including: an internal combustion engine that is rotatable independently of a driving state of the hybrid vehicle; a rotational resistance adjustment structure that adjusts a rotational resistance of the internal combustion engine; an engine-starting motor that is driven for motoring of the internal combustion engine; an accumulator unit that is chargeable and dischargeable; and a driving motor that has power generation capability and inputs and outputs driving power through transmission of electric power to and from at least one of the engine-starting motor and the accumulator unit. When the accumulator unit is in an unchargeable state at a timing of a braking force demand by release of both an accelerator and a brake, the control method of the invention controls the rotational resistance adjustment structure to adjust the rotational resistance of the internal combustion engine according to the braking force demand, controls the driving motor to drive the hybrid vehicle with a braking force equivalent to the braking force demand, and controls the engine-starting motor to consume regenerative electric power generated by the driving motor.

When the accumulator unit is in the unchargeable state at the timing of the braking force demand by the release of both the accelerator and the brake, the control method of the invention controls the rotational resistance adjustment structure to adjust the rotational resistance of the internal combustion engine according to the braking force demand, controls the driving motor to drive the hybrid vehicle with a braking force equivalent to the braking force demand, and controls the engine-starting motor to consume the regenerative electric power generated by the driving motor. This arrangement effectively satisfies the braking force demand by regenerative control of the driving motor even when the accumulator unit is in the unchargeable state at the timing of the braking force demand by the release of both the accelerator and the brake.

BEST MODES OF CARRYING OUT THE INVENTION

Figure 1:
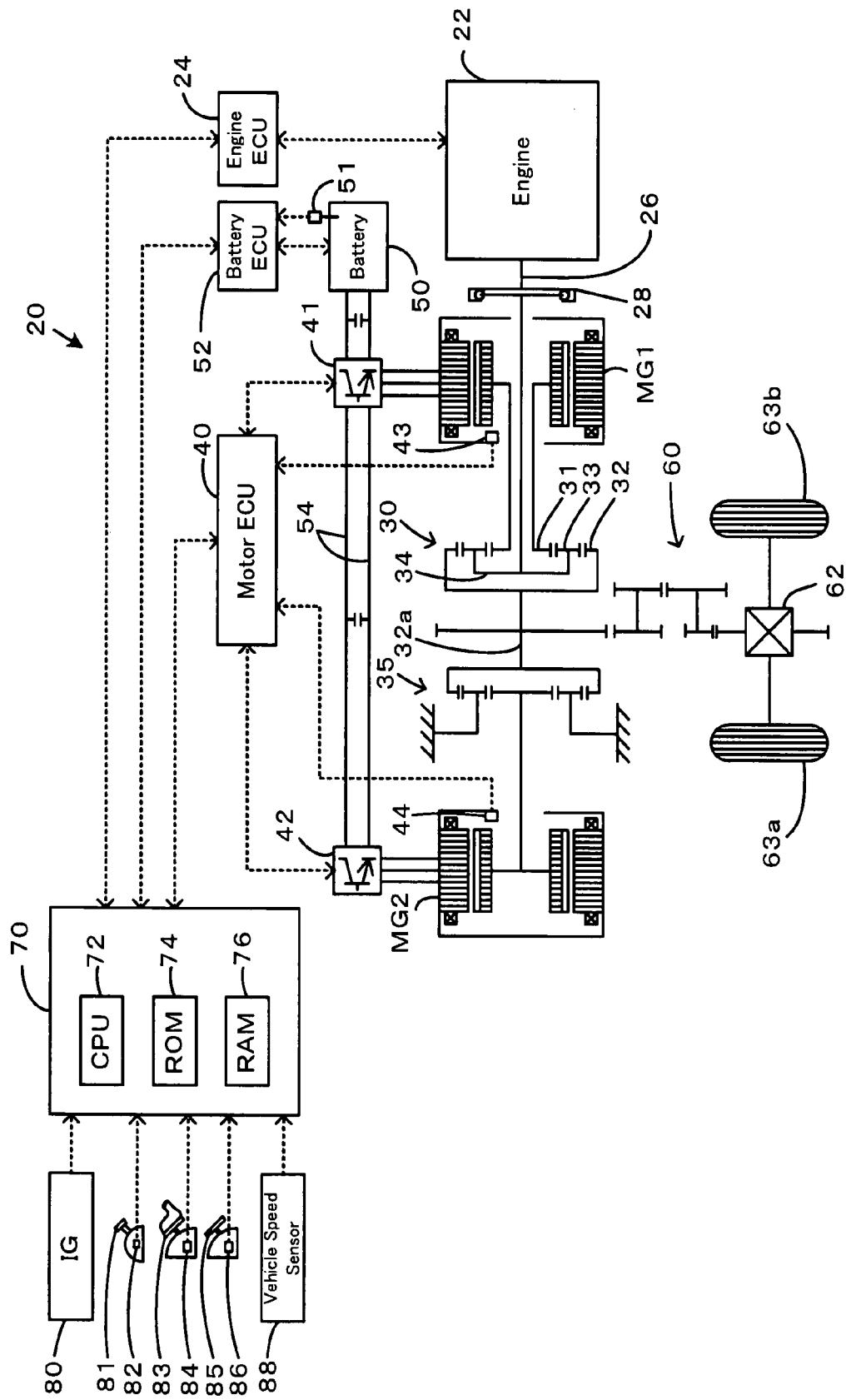
FIG. 1 schematically illustrates the configuration of a hybrid vehicle in one embodiment of the invention.
Figure 2:
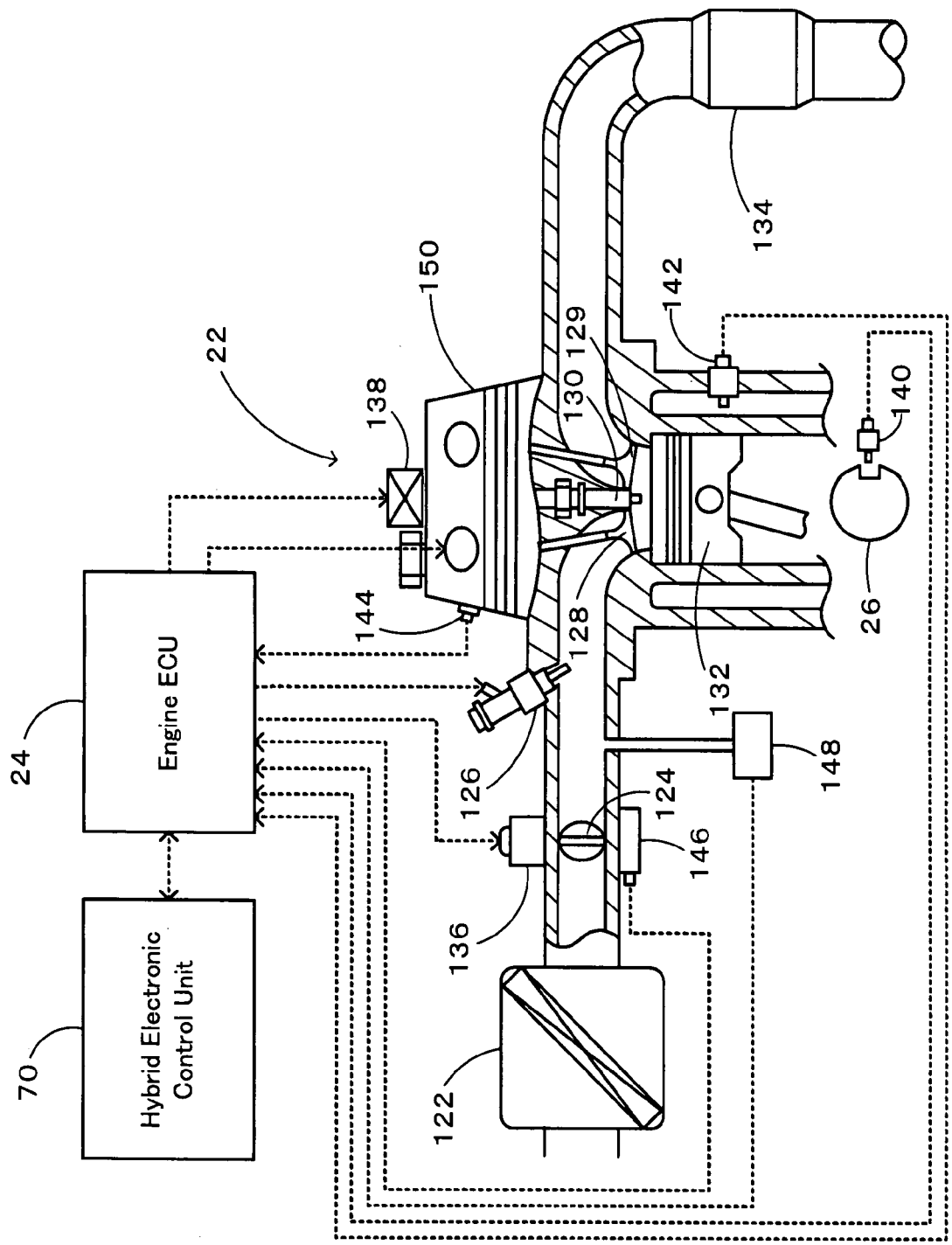
FIG. 2 schematically shows the structure of an engine mounted on the hybrid vehicle of the embodiment.

One mode of carrying out the invention is discussed below as a preferred embodiment. FIG. 1 schematically illustrates the configuration of a hybrid vehicle 20 in one embodiment of the invention. FIG. 2 schematically shows the structure of an engine 22 mounted on the hybrid vehicle 20 of the embodiment. As illustrated, the hybrid vehicle 20 of the embodiment includes the engine 22, a three shaft-type power distribution integration mechanism 30 that is linked to a crankshaft 26 or an output shaft of the engine 22 via a damper 28, a motor MG1 that is connected to the power distribution integration mechanism 30 and has power generation capability, a reduction gear 35 that is attached to a ring gear shaft 32*a* or a driveshaft linked with the power distribution integration mechanism 30, a motor MG2 that is connected to the reduction gear 35, and a hybrid electronic control unit 70 that controls the operations of the whole hybrid vehicle 20.

The engine 22 is an internal combustion engine that consumes a hydrocarbon fuel, such as gasoline or light oil, to output power. As shown in FIG. 2, the air cleaned by an air cleaner 122 and taken in via a throttle valve 124 is mixed with the atomized gasoline injected by a fuel injection valve 126 to the air-fuel mixture. An intake valve 128 is opened to introduce the air-fuel mixture into a combustion chamber. The introduced air-fuel mixture is ignited with spark of an ignition plug 130 to be explosively combusted. The reciprocating motions of a piston 132 by the combustion energy are converted into rotational motions of the crankshaft 26. The exhaust from the engine 22 goes through a catalytic converter (three-way catalyst) 134 that converts toxic components included in the exhaust, that is, carbon monoxide (CO), hydrocarbons (HC), and nitrogen oxides (NOx), into harmless components, and is discharged to the outside air.

The engine 22 is under control of an engine electronic control unit 24 (hereafter referred to as engine ECU 24). The engine ECU 24 receives, via its input port (not shown), signals from various sensors that measure and detect the conditions of the engine 22. The signals input into the engine ECU 24 include a crank position from a crank position sensor 140 measured as the rotational position of the crankshaft 26, a cooling water temperature from a water temperature sensor 142 measured as the temperature of cooling water for the engine 22, a cam position from a cam position sensor 144 measured as the rotational position of a camshaft driven to open and close the intake valve 128 and an exhaust valve 129 for gas intake and exhaust into and from the combustion chamber, a throttle valve position from a throttle valve position sensor 146 detected as the opening of the throttle valve 124, and an intake negative pressure or an amount of intake air from a vacuum sensor 148 measured as the load of the engine 22. The engine ECU 24 outputs, via its output port (not shown), diverse control signals and driving signals to drive and control the engine 22, for example, driving signals to the fuel injection valve 126, driving signals to a throttle motor 136 for regulating the position of the throttle valve 124, control signals to an ignition coil 138 integrated with an igniter, and control signals to a variable valve timing mechanism 150 to vary the open and close timings of the intake valve 128 and the exhaust valve 129. The engine ECU 24 communicates with the hybrid electronic control unit 70. The engine ECU 24 receives control signals from the hybrid electronic control unit 70 to drive and control the engine 22, while outputting data regarding the driving conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with, the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32*a*. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32*a*. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32*a*, simultaneously with charge or discharge of the battery 50. The motor drive mode stops the operations of the engine 22 and drives and controls the motor MG2 to output a quantity of power equivalent to the required level of power to the ring gear shaft 32*a*. In an accelerator-released state, that is, in response to the driver's release of the accelerator pedal 83, a braking torque demand is set according to the gearshift position SP and the vehicle speed V. The engine 22 and the two motors MG1 and MG2 are then controlled to apply a braking torque equivalent to the set braking torque demand onto the ring gear shaft 32*a*. When the state of charge SOC of the battery 50 is less than a preset level, for example, 90%, the motor MG2 converts a greater portion of kinetic energy into regenerative electric power and charges the battery 50 with the regenerative electric power. When the state of charge SOC of the battery 50 reaches or exceeds the preset level, the engine 22 and the motors MG1 and MG2 are controlled to minimize the charge of the battery 50. In response to the driver's depression of the brake pedal 85 in the accelerator-released state, the braking torque demand is set according to the brake pedal position BP and the vehicle speed V. The engine 22 and the two motors MG1 and MG2 are then controlled to apply a braking torque equivalent to the set braking torque demand onto the ring gear shaft 32*a*, while a mechanical brake (not shown) attached to the drive wheels 63*a* and 63*b* is actuated.

Figure 3:
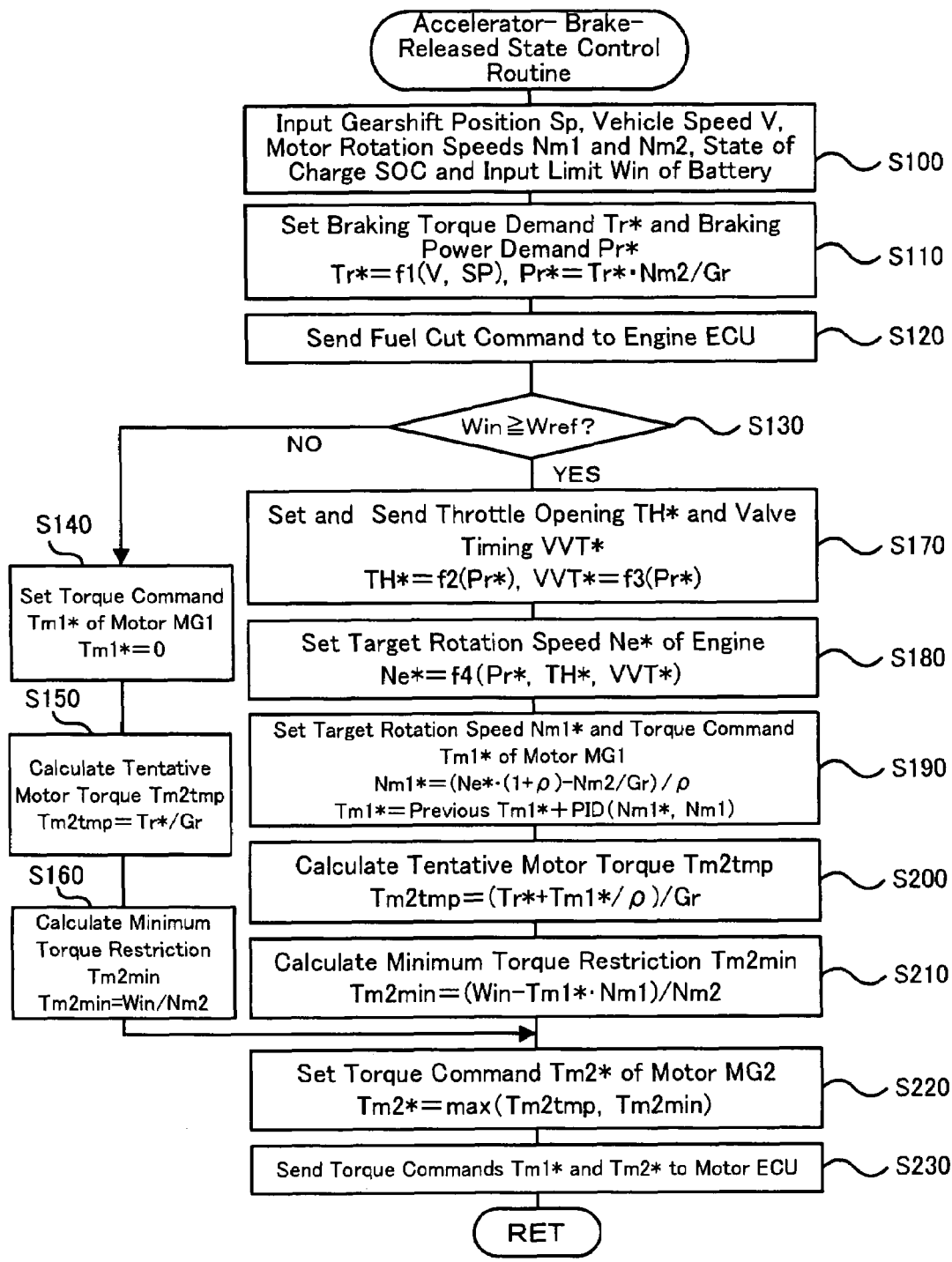
FIG. 3 is a flowchart showing an accelerator-brake-released state control routine executed by a hybrid electronic control unit included in the hybrid vehicle of the embodiment.

The description now regards the operations of the hybrid vehicle 20 of the embodiment having the configuration discussed above, especially a series of control operations in the release of both the accelerator pedal 83 and the brake pedal 85. FIG. 3 is a flowchart showing an accelerator-brake-released state control routine executed by the hybrid electronic control unit 70 in the hybrid vehicle 20 of the embodiment. This routine is executed repeatedly at preset time intervals, for example, at every 8 msec, in the state of the accelerator opening Acc of 0% measured by the accelerator pedal position sensor 84 and the brake pedal position BP of 0% measured by the brake pedal position sensor 86.

Figure 4:
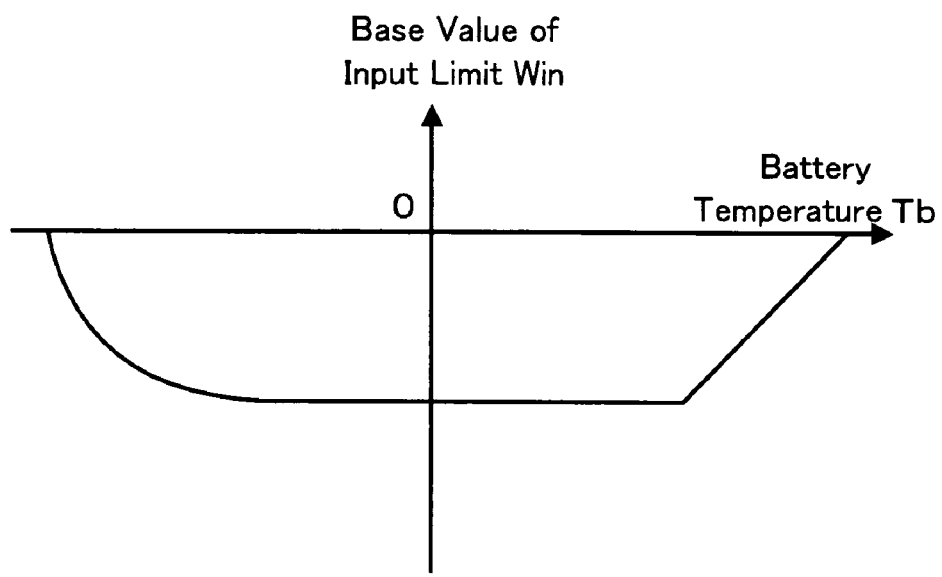
FIG. 4 is a map showing a variation in base value of input limit Win against battery temperature Tb.
Figure 5:
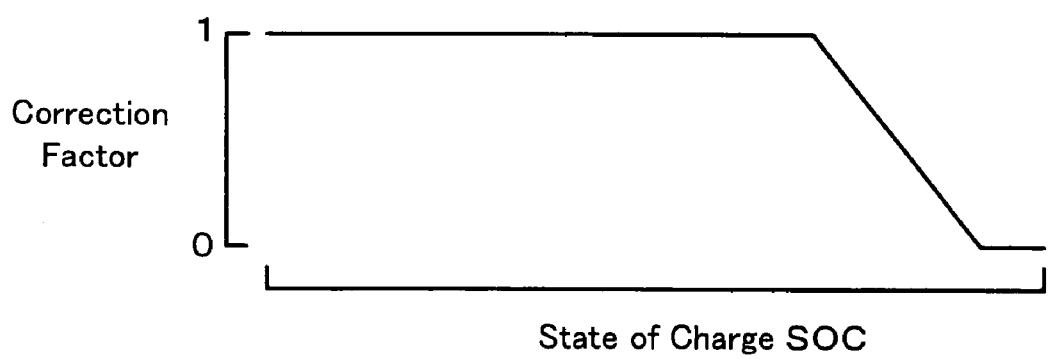
FIG. 5 is a map showing a variation in correction factor against state of charge SOC of a battery.

In the accelerator-brake-released state control routine, the CPU 72 of the hybrid electronic control unit 70 first inputs various data required for control, that is, the gearshift position SP from the gearshift position sensor 82, the vehicle speed V from the vehicle speed sensor 88, rotation speeds Nm1 and Nm2 of the motors MG1 and MG2, the state of charge SOC of the battery 50, and an input limit Win of the battery 50 (step S100). The rotation speeds Nm1 and Nm2 of the motors MG1 and MG2 are computed by the motor ECU 40 from the rotational positions of the respective rotors in the motors MG1 and MG2 detected by the rotational position detection sensors 43 and 44 and are received from the motor ECU 40 by communication. The state of charge SOC is computed by the battery ECU 52 from the charge-discharge current of the battery 50 measured by the electric current sensor and is received from the battery ECU 52 by communication. The input limit Win of the battery 50 is set by the battery ECU 52 based on the battery temperature Tb and the state of charge SOC and is received from the battery ECU 52 by communication. A concrete procedure of setting the input limit Win in this embodiment specifies a base value of the input limit Win corresponding to the battery temperature Tb, selects a correction factor corresponding to the state of charge SOC, and multiplies the specified base value of the input limit Win by the selected correction factor to set the input limit Win. A variation in base value of the input limit Win against the battery temperature Tb is shown in the map of FIG. 4, and a variation in correction factor against the state of charge SOC of the battery 50 is shown in the map of FIG. 5.

Figure 6:
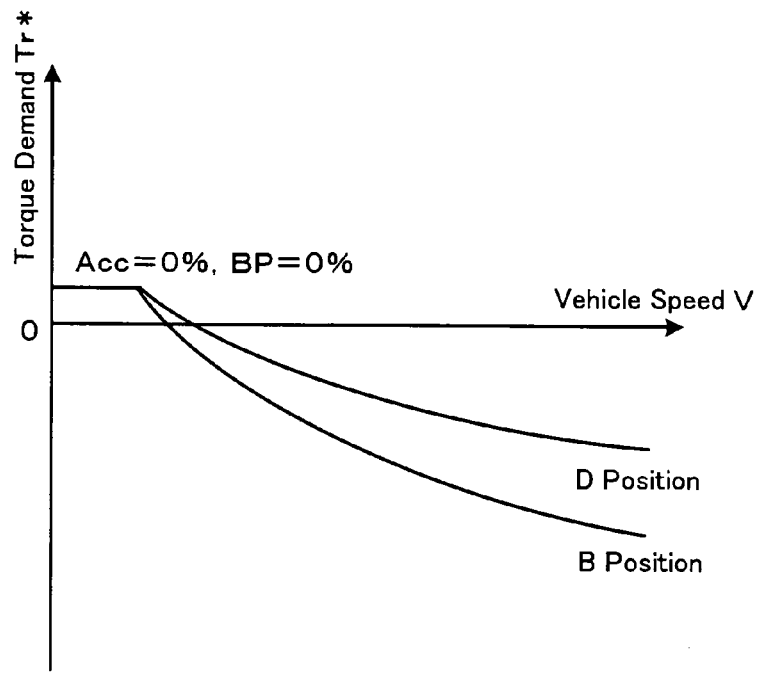
FIG. 6 shows one example of a braking torque demand setting map.

After the data input, the CPU 72 sets a braking torque demand Tr* and a braking power demand Pr*, which are to be output to the ring gear shaft 32*a* or the driveshaft linked to the drive wheels 63*a* and 63*b*, in the release of both the accelerator pedal 83 and the brake pedal 85, based on the input gearshift position SP and the input vehicle speed V (step S110). A concrete procedure of setting the braking torque demand Tr* in this embodiment stores in advance variations in braking torque demand Tr* against the gearshift position SP and the vehicle speed V as a braking torque demand setting map in the ROM 74 and reads the braking torque demand Tr* corresponding to the given gearshift position SP and the given vehicle speed V from the map. One example of the braking torque demand setting map is shown in FIG. 6. The braking power demand Pr* is computed by multiplying the braking torque demand Tr* by a rotation speed Nr of the ring gear shaft 32*a*. The rotation speed Nr of the ring gear shaft 32*a* is obtained by multiplying the vehicle speed V by a conversion factor k or by dividing the rotation speed Nm2 of the motor MG2 by a gear ratio Gr of the reduction gear 35.

The CPU 72 sends a fuel cut command to the engine ECU 24 to cut off the fuel supply to the engine 22 (step S120). The input limit Win of the battery 50 is compared with a preset reference level Wref (step S130). The reference level Wref represents a threshold value to identify the battery 50 either in a chargeable state or in an unchargeable state and is set equal to 0 or slightly below 0.

When the input limit Win of the battery 50 is lower than the preset reference level Wref at step S130, the CPU 72 identifies the battery 50 in the chargeable state and sets a value '0' to a torque command Tm1* to be output from the motor MG1 (step S140). The CPU 72 then divides the braking torque demand Tr* by the gear ratio Gr of the reduction gear 35 to calculate a tentative motor torque Tm2tmp to be output from the motor MG2 (step S150), and divides the input limit Win by the rotation speed Nm2 of the motor MG2 to calculate a minimum torque restriction Tm2min as an allowable lower limit of torque output from the motor MG2 (step S160). The CPU 72 sets the greater between the calculated tentative motor torque Tm2tmp and the calculated minimum torque restriction Tm2min to a torque command Tm2* of the motor MG2 (step S220). The torque command Tm2* is accordingly set with restriction of the input limit Win of the battery 50. The CPU 72 sends the torque commands Tm1* and Tm2* of the motors MG1 and MG2 to the motor ECU 40 (step S230) and then exits from the accelerator-brake-released state control routine. The motor ECU 40 receives the torque commands Tm1* and Tm2* and performs switching control of the switching elements included in the respective inverters 41 and 42 to drive the motor MG1 with the torque command Tm1* and the motor MG2 with the torque command Tm2*. The regenerative control of the motor MG2 ensures output of a braking torque equivalent to the braking torque demand Tr* to the ring gear shaft 32a or the driveshaft. The battery 50 is charged with the regenerative electric power generated by the regenerative control of the motor MG2.

When the input limit Win of the battery 50 is not lower than the preset reference level Wref at step S130, on the other hand, the CPU 72 identifies the battery 50 in the unchargeable state and sets a throttle opening TH* and a valve timing VVT* corresponding to the braking power demand Pr* set at step S110 and sends the settings of the throttle opening TH* and the valve timing VVT* to the engine ECU 24 (step S170). The throttle opening TH* and the valve timing VVT* are set to increase a pumping loss in rotation speed of the engine 22 with a decrease in braking power demand Pr* (that is, an increase in absolute value of the braking power demand Pr*). A concrete procedure of setting the throttle opening TH* and the valve timing VVT* in this embodiment stores in advance a variation in throttle opening TH* against the braking power demand Pr* and a variation in valve timing VVT* against the braking power demand Pr* as maps in the ROM 74 and reads the throttle opening TH* and the valve timing VVT* corresponding to the given braking power demand Pr* from the respective maps.

After setting and transmission of the throttle opening TH* and the valve timing VVt*, a target rotation speed Ne* of the engine 22 is set, based on the throttle opening TH*, the valve timing VVT*, and the braking power demand Pr* (step S180). The target rotation speed Ne* of the engine 22 is set to match a braking power by the pumping loss of the engine 22 with the braking power demand Pr*. A concrete procedure of setting the target rotation speed Ne* of the engine 22 in this embodiment stores in advance variations in target rotation speed Ne* against the throttle opening TH*, the valve timing VVT*, and the braking power demand Pr* as a map in the ROM 74 and reads the target rotation speed Ne* corresponding to the given throttle opening TH*, the given valve timing VVT*, and the given braking power demand Pr* from the map.

After setting the target rotation speed Ne* of the engine 22, the CPU 72 calculates a target rotation speed Nm1* of the motor MG1 from the target rotation speed Ne*, the rotation speed Nr (=Nm2/Gr) of the ring gear shaft 32a, and a gear ratio ρ of the power distribution integration mechanism 30 according to Equation (1) given below, while calculating a torque command Tm1* of the motor MG1 from the calculated target rotation speed Nm1* and the current rotation speed Nm1 of the motor MG1 according to Equation (2) given below (step S190):

$$Nm1^* = (Ne^* \cdot (1+\rho) - Nm2/Gr)/\rho \qquad (1)$$

$$Tm1^* = \text{Previous } Tm1^* + KP(Nm1^* - Nm1) + KI\int(Nm1^* - Nm1)dt \qquad (2)$$

Figure 7:
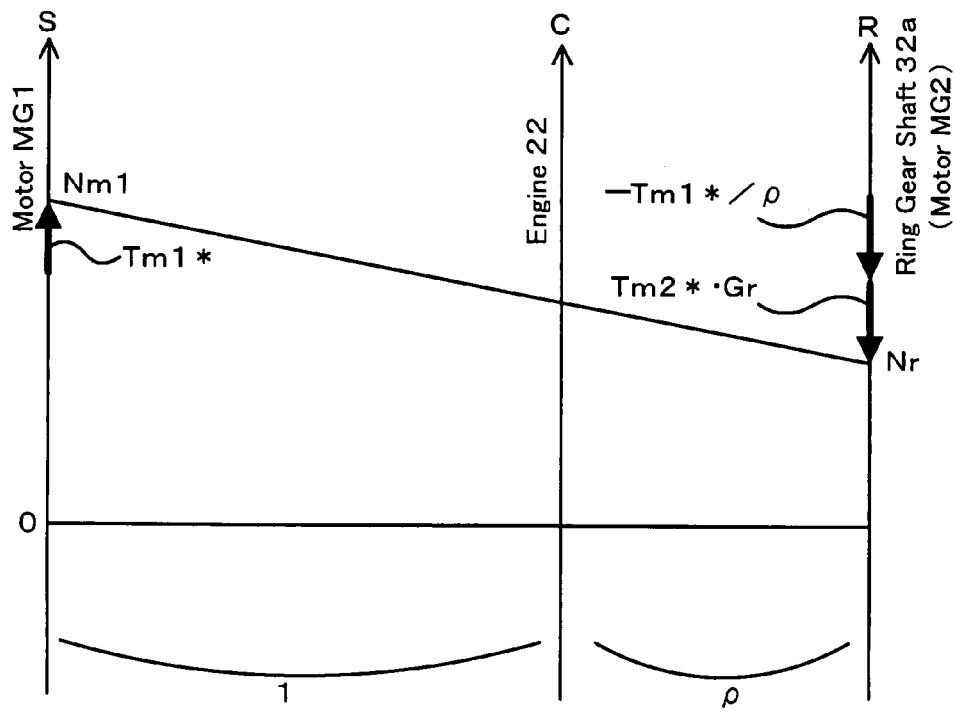
FIG. 7 shows output of a braking torque demand Tr* to a ring gear shaft.

Equation (2) is a relational expression of feedback control to drive and rotate the motor MG1 at the target rotation speed Nm1*. In Equation (2) given above, 'KP' in the second term and 'KI' in the third term on the right side respectively denote a gain of the proportional and a gain of the integral term. As the motor MG1 is controlled to be driven and rotated with the torque command Tm1* and the target rotation speed Nm1*, the engine 22 is driven at a rotation speed determined by the gear ratio ρ of the power distribution integration mechanism 30. An alignment chart in this state is shown in FIG. 7. The left axis 'S', the middle axis 'C', and the right axis 'R' respectively show the rotation speed of the sun gear 31, the rotation speed Nr of the carrier 34, and the rotation speed of the ring gear 32 (ring gear shaft 32a). Two thick arrows on the axis 'R' in FIG. 7 represent a torque (−Tm1*/ρ) directly transmitted to the ring gear shaft 32a by the pumping loss of the engine 22 driven in the ordinary state at the target rotation speed Ne* and a torque applied by the motor MG2 to the ring gear shaft 32a.

After setting the torque command Tm1* of the motor MG1, the CPU 72 calculates the tentative motor torque Tm2tmp, which is to be output from the motor MG2, from the torque command Tm1*, the gear ratio ρ(=number of teeth of the sun gear 31/number of teeth of the ring gear 32) of the power distribution integration mechanism 30, and the gear ratio Gr of the reduction gear 35 according to Equation (3) given below (step S200):

$$Tm2tmp = (Tr^* + Tm1^*/\rho)/Gr \qquad 3$$

The tentative motor torque Tm2tmp is determined to ensure output of the braking torque demand Tr* to the ring gear shaft 32a as a sum of the torque (−Tm1*/ρ) directly transmitted to the ring gear shaft 32a by the pumping loss of the engine 22 and the output torque of the motor MG2. The CPU 72 then calculates the minimum torque restriction Tm2min as the allowable lower limit of torque output from the motor MG2, from the input limit Win of the battery 50, the torque command Tm1* and the rotation speed Nm1 of the motor MG1, and the rotation speed Nm2 of the motor MG2 according to Equation (4) given below (step S210):

$$Tm2min = (Win - Tm1^* \cdot Nm1)/Nm2 \qquad (4)$$

The CPU 72 sets the greater between the calculated tentative motor torque Tm2tmp and the calculated minimum torque restriction Tm2min to the torque command Tm2* of the motor MG2 (step S220), sends the torque commands Tm1* and Tm2* of the motors MG1 and MG2 to the motor ECU 40 (step S230), and then exits from the accelerator-brake-released state control routine.

Under the condition that the battery 50 is in the unchargeable state, the motor MG1 consumes the regenerative electric power generated by the regenerative control of the motor MG2 and the power produced by the consumption of electric power by the motor MG1 is consumed in the form of heat by the pumping loss of the engine 22, while part of the pumping loss is directly transmitted to the ring gear shaft 32a. The engine 22 has the pumping loss increase with an increase in rotation speed. The relatively large absolute value of the braking power demand Pr* causes the high regenerative electric power of the motor MG2 and the high power produced by the consumption of electric power by the motor MG1. In this state, the produced power may not be fully consumed by the pumping loss of the engine 22. The control routine of the embodiment sets the throttle opening TH* and the valve timing VVT* to increase the pumping loss of the engine 22 with an increase in absolute value of the braking power demand Pr*. Such setting increases the torque directly transmitted to the ring gear shaft 32a by the pumping loss of the engine 22 to lower the level of regenerative electric power of the motor MG2. The decreased regenerative electric power of the motor MQ2 enables the power produced by the consumption of regenerative electric power by the motor MG1 to be fully consumed by the pumping loss of the engine 22. The braking power demand Pr* can thus be output to the ring gear shaft 32a even in the unchargeable state of the battery 50. The control routine of the embodiment sets the torque command Tm1* of the motor MG1 to ensure output of the whole braking power demand Pr* from the engine 22. The electric power generated by the regenerative control of the motor MG2 is thus all consumed by the motor MG1. This enables output of the braking power demand Pr* to the ring gear shaft 32a without charge or discharge of the battery 50.

As described above, when the battery 50 is in the unchargeable state in the release of both the accelerator pedal 83 and the brake pedal 85, the hybrid vehicle 20 of the embodiment sets the throttle opening TH* and the valve timing VVT* to increase the pumping loss in rotation speed of the engine 22 with an increase in absolute value of the braking power demand Pr*, which varies with a variation in braking torque demand Tr*, and controls the engine 22 with the throttle opening TH* and the valve timing VVT*. The electric power generated by the regenerative control of the motor MG2 is consumed by the pumping loss of the engine 22 motored by the motor MG1. This ensures output of the braking torque demand Tr* to the ring gear shaft 32a even in the unchargeable state of the battery 50.

The hybrid vehicle 20 of the embodiment sets the throttle opening TH* and the valve timing VVT* corresponding to the braking power demand Pr*. The throttle opening TH* and the valve timing VVT* may alternatively be set corresponding to the gearshift position SP. In this case, the hybrid vehicle 20 executes the processing of steps S170a to S170c in a modified flow of the accelerator-brake-released state control routine of FIG. 8, in place of the processing of step S170 in the accelerator-brake-released state control routine of FIG. 3. The identical steps with those in the control routine of FIG. 3 are omitted from the flowchart of FIG. 8. In the modified flow of the accelerator-brake-released state control routine of FIG. 8, when the input limit Win reaches or exceeds the preset reference level Wref at step S130 (see FIG. 3), that is, in response to identification of the battery 50 in the unchargeable state, the CPU 72 identifies the gearshift position SP (S170a) In the setting of the gearshift position SP to a D (drive) position, the CPU 72 respectively sets the throttle opening TH* and the valve timing VVT* to a preset opening TH1 and a preset level VVT1 (step S170b). In the setting of the gearshift position SP to a B (brake) position, the CPU 72 respectively sets the throttle opening TH* and the valve timing VVT* to a preset opening TH2 and a preset level VVT2 (step S170c). The openings TH1 and TH2 and the levels VVT1 and VVT2 are adequately set to ensure the greater pumping loss in rotation speed of the engine 22 in the B position than in the pumping loss in the D position.

Figure 8:
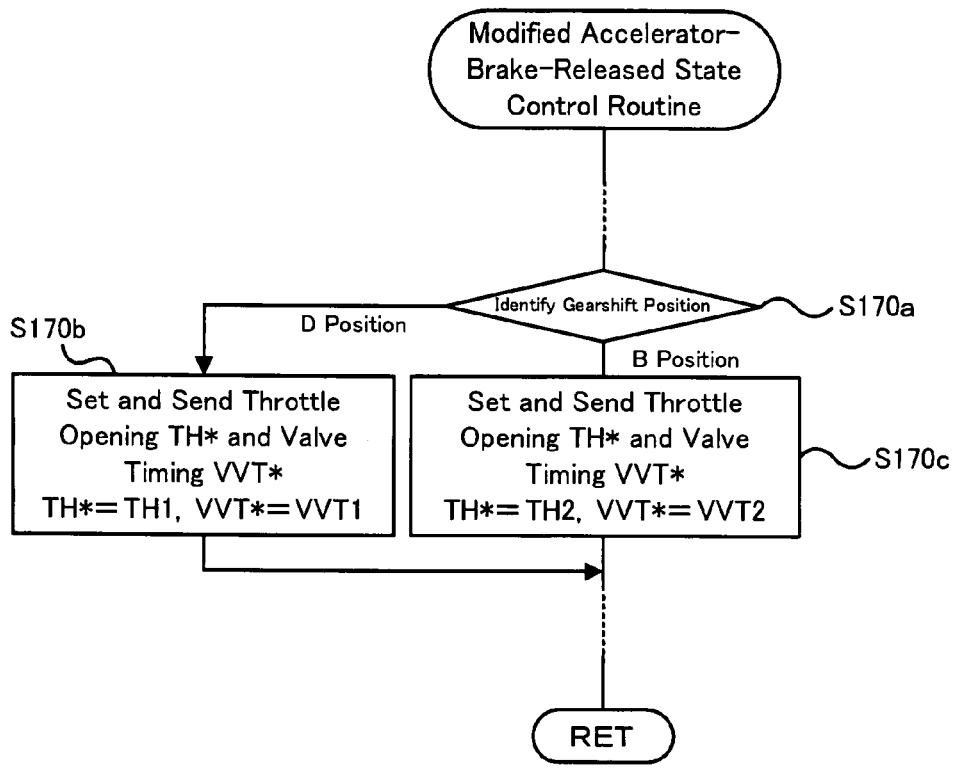
FIG. 8 is a flowchart showing a modified flow of the accelerator-brake-released state control routine.

The modified flow of the accelerator-brake-released state control routine shown in FIG. 8 sets the throttle opening TH* and the valve timing VVT* corresponding to the setting of the gearshift position SP detected by the gearshift position sensor 82, that is, either the D position or the B position. The accelerator-brake-released state control is also applicable to a hybrid vehicle equipped with a sequential gearshift. The sequential gearshift includes an upshift request for an upshift of the gear position and a downshift request for a downshift of the gear position to change the rotation speed of the engine 22 against the vehicle speed V or to change the level of braking force output to the ring gear shaft 32a in response to the driver's release of the accelerator pedal 83, among multiple available levels, for example, among six available levels. The throttle opening TH* and the valve timing VVT* may be set in response to the upshift request or the downshift request in the sequential gearshift. The throttle opening TH* and the valve timing VVT* are preferably set to increase the pumping loss in rotation speed of the engine 22 in response to a gearshift request requiring the greater braking force.

The hybrid vehicle 20 of the embodiment adjusts the pumping loss (rotational resistance) of the engine 22 according to both the throttle opening TH* and the valve timing VVT*. The pumping loss of the engine 22 may be adjusted according to only the throttle opening TH* at a fixed valve timing VVT* or may be adjusted according to only the valve timing VVT* at a fixed throttle opening TH*. The pumping loss of the engine 22 may otherwise be adjusted by another suitable technique.

The hybrid vehicle 20 of the embodiment adjusts the pumping loss of the engine 22 and sets the torque command Tm1* of the motor MG1 to balance the consumed electric power by the motor MG1 with the regenerative electric power by the motor MG2. One possible modification may adjust the pumping loss of the engine 22 and set the torque command Tm1* of the motor MG1 to enable the motor MG1 to consume a higher electric power than the electric power regenerated by the motor MG2.

Figure 9:
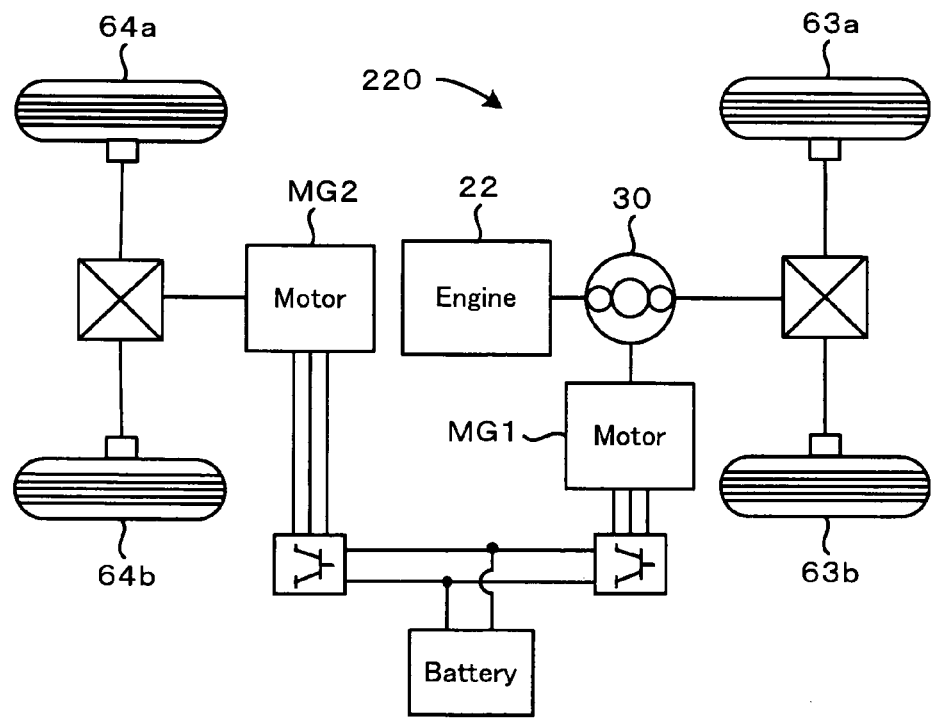
FIG. 9 schematically illustrates the configuration of another hybrid vehicle as one modified example.

In the hybrid vehicle 20 of the embodiment, the power of the motor MG2 goes through the gear change by the reduction gear 35 and is output to the ring gear shaft 32a. The technique of the invention is, however, not restricted to this configuration but is also applicable to a hybrid vehicle 220 of one modified example shown in FIG. 9. In the hybrid vehicle 220 of this modified configuration, the power of the motor MG2 is connected to a different axle (axle linked to wheels 64a and 64b) from an axle connected with the ring gear shaft 32a (axle linked to the drive wheels 63a and 63b).

Figure 10:
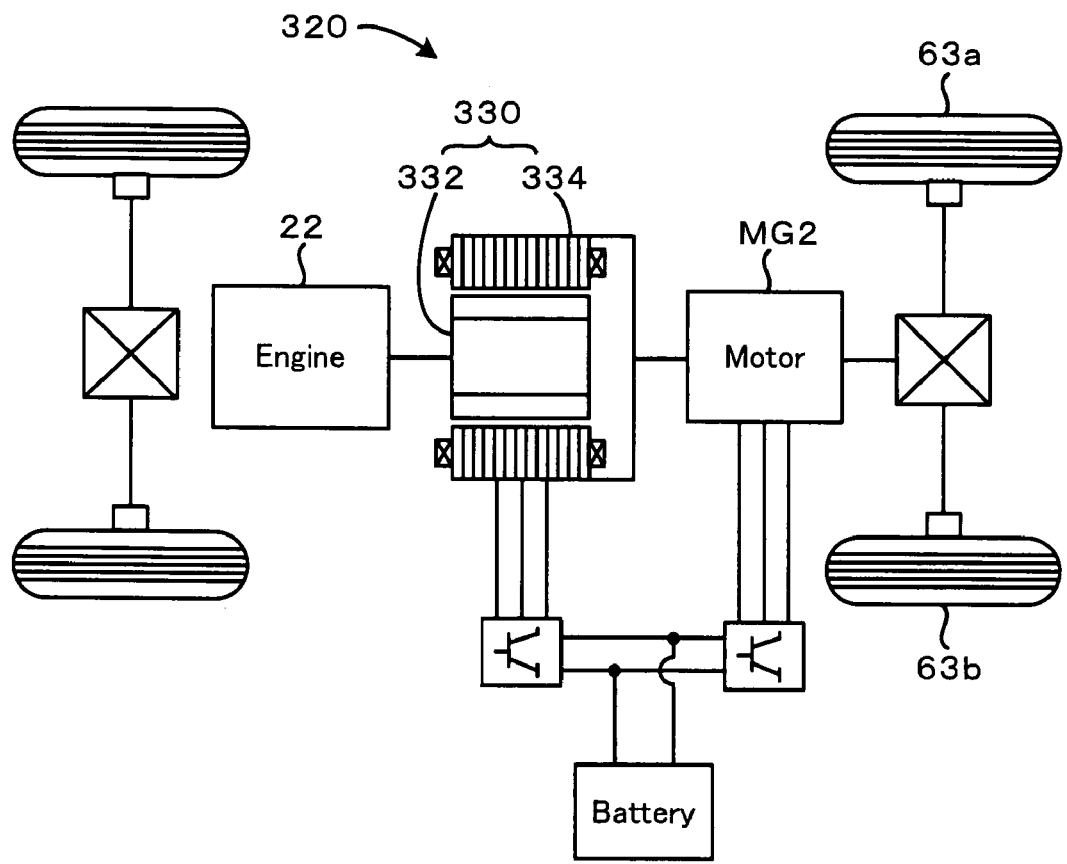
FIG. 10 schematically illustrates the configuration of still another hybrid vehicle as another modified example.

In the hybrid vehicle 20 of the embodiment, the power of the engine 22 is output via the power distribution integration mechanism 30 to the ring gear shaft 32a or the driveshaft linked to the drive wheels 63a and 63b. The technique of the invention is, however, not restricted to this configuration but is also applicable to a hybrid vehicle 320 of another modified example shown in FIG. 10. The hybrid vehicle 320 of this modified configuration has a pair-rotor motor 330 that includes an inner rotor 332 connected to a crankshaft 26 of the engine 22 and an outer rotor 334 connected to a driveshaft to output power to the drive wheels 63a and 63b. The pair-rotor motor 330 transmits part of the output power of the engine 22 to the driveshaft, while converting residual part of the output power into electric power.

Figure 11:
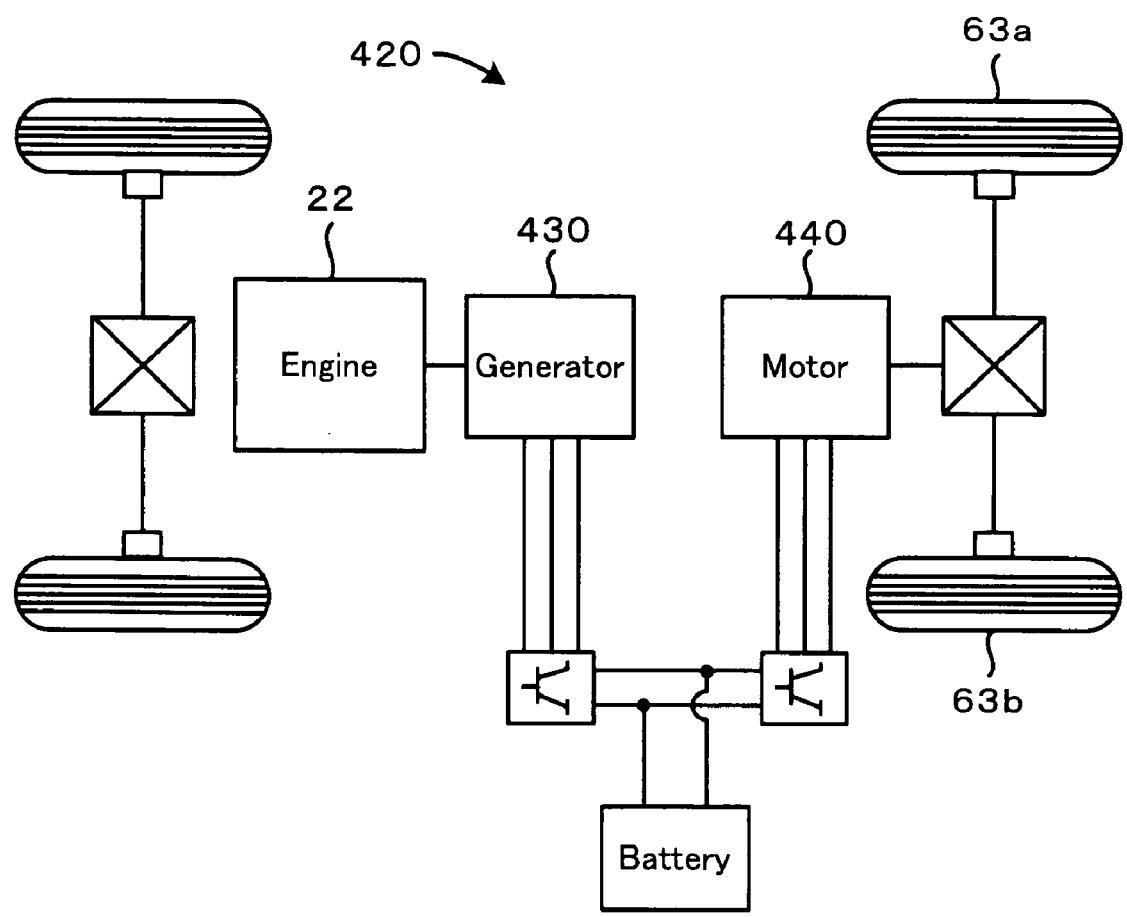
FIG. 11 schematically illustrates the configuration of another hybrid vehicle as still another modified example.

In the hybrid vehicle 20 of the embodiment, the power of the engine 22 is output to the ring gear shaft 32a or the driveshaft linked to the drive wheels 63a and 63b. The technique of the invention is, however, not restricted to this configuration but is also applicable to a hybrid vehicle 420 of still another modified example shown in FIG. 11. The hybrid vehicle 420 of this modified configuration has a generator 430 that is connected to a crankshaft of the engine 22 and a motor 440 that inputs and outputs power from and to a driveshaft linked with the drive wheels 63a and 63b through input and output of electric power from and to the generator 430.

The embodiment and its modifications discussed above are to be considered in all aspects as illustrative and not restrictive. There may be many other modifications, changes, and alterations without departing from the scope or spirit of the main characteristics of the present invention.

INDUSTRIAL APPLICABILITY

The technique of the invention is preferably applicable to automobile industries and other relevant industries.

The invention claimed is:

1. A hybrid vehicle, comprising:
an internal combustion engine that is rotatable independently of a driving state of said hybrid vehicle;
a rotational resistance adjustment structure that adjusts a rotational resistance of the internal combustion engine;
an engine-starting motor that is driven for motoring of the internal combustion engine;
an accumulator unit that is chargeable and dischargeable;
a driving motor that has power generation capability and inputs and outputs driving power through transmission of electric power to and from at least one of the engine-starting motor and the accumulator unit; and
an accelerator-brake-released state control module that, when the accumulator unit is in an unchargeable state at a timing of a braking force demand by release of both an accelerator and a brake, controls the rotational resistance adjustment structure to adjust the rotational resistance of the internal combustion engine according to the braking force demand, controls the driving motor to drive said hybrid vehicle with a braking force equivalent to the braking force demand and to generate regenerative electric power, and controls the engine-starting motor to consume the regenerative electric power generated by the driving motor by having the engine-starting motor operate to motor the internal combustion engine.

2. A hybrid vehicle in accordance with claim 1, wherein the rotational resistance adjustment structure regulates a throttle opening to adjust the rotational resistance of the internal combustion engine.

3. A hybrid vehicle in accordance with claim 1, wherein the rotational resistance adjustment structure regulates an air intake-exhaust timing to adjust the rotational resistance of the internal combustion engine.

4. A hybrid vehicle in accordance with claim 1, wherein when the accumulator unit is in the unchargeable state at the timing of the braking force demand, the accelerator-brake-released state control module controls the rotational resistance adjustment structure to increase the rotational resistance of the internal combustion engine with an increase in braking force demand.

5. A hybrid vehicle in accordance with claim 1, said hybrid vehicle further comprising:
a gearshift position setting module that, in response to a driver's operation, selects and sets one gearshift position among multiple available gearshift positions, which require multiple different levels of braking force in the release of the accelerator and the brake,
wherein when the accumulator unit is in the unchargeable state at the timing of the braking force demand, said accelerator-brake-released state control module controls the rotational resistance adjustment structure to adjust the rotational resistance of the internal combustion engine corresponding to the selected gearshift position.

6. A hybrid vehicle in accordance with claim 5, wherein said accelerator-brake-released state control module controls the rotational resistance adjustment structure to increase the rotational resistance of the internal combustion engine in response to selection and setting of a gearshift position requiring a higher level of braking force among the multiple available gearshift positions.

7. A hybrid vehicle in accordance with claim 1, said hybrid vehicle further comprising:
a gearshift position setting module that, in response to a driver's operation, selects and sets one gearshift position among multiple available gearshift positions, where the multiple available gearshift positions include a drive position requiring a first braking force as the braking force demand in the release of both the accelerator and the brake and a brake position requiring a second braking force, which is greater than the first braking force, as the braking force demand in the release of both the accelerator and the brake,
wherein when the accumulator unit is in the unchargeable state at the timing of the braking force demand, said accelerator-brake-released state control module controls the rotational resistance adjustment structure to adjust the rotational resistance of the internal combustion engine to a first rotational resistance in response to selection and setting of the drive position as the selected gearshift position, while controlling the rotational resistance adjustment structure to adjust the rotational resistance of the internal combustion engine to a second rotational resistance, which is higher than the first rotational resistance, in response to selection and setting of the brake position as the selected gearshift position.

8. A hybrid vehicle in accordance with claim 1, said hybrid vehicle being driven by directly utilizing part of output power of the internal combustion engine.

9. A hybrid vehicle in accordance with claim 8, said hybrid vehicle further comprising:
a three shaft-type power input output assembly that is linked to three shafts, an output shaft of the internal combustion engine, a rotating shaft of the engine-starting motor, and a driveshaft linked with an axle of said hybrid vehicle, and automatically inputs and outputs power from and to a residual one shaft based on powers input from and output to any two shafts among the three shafts.

10. A hybrid vehicle in accordance with claim 8, wherein the engine-starting motor is a pair-rotor motor having a first rotor that is connected to an output shaft of the internal combustion engine and a second rotor that is connected to a driveshaft linked with an axle of said hybrid vehicle and rotates relative to the first rotor through an electromagnetic function.

11. A control method of a hybrid vehicle including: an internal combustion engine that is rotatable independently of a driving state of said hybrid vehicle; a rotational resistance adjustment structure that adjusts a rotational resistance of the internal combustion engine; an engine-starting motor that is driven for motoring of the internal combustion engine; an accumulator unit that is chargeable and dischargeable; and a driving motor that has power generation capability and inputs and outputs driving power through transmission of electric power to and from at least one of the engine-starting motor and the accumulator unit,
when the accumulator unit is in an unchargeable state at a timing of a braking force demand by release of both an accelerator and a brake, said control method controls the rotational resistance adjustment structure to adjust the rotational resistance of the internal combustion engine according to the braking force demand, controls the driving motor to drive said hybrid vehicle with a braking force equivalent to the braking force demand and to generate regenerative electric power, and controls the engine-starting motor to consume the regenerative electric power generated by the driving motor by having the engine-starting motor operate to motor the internal combustion engine.

* * * * *

UNITED STATES PATENT AND TRADEMARK OFFICE
CERTIFICATE OF CORRECTION

PATENT NO. : 7,610,974 B2 Page 1 of 1
APPLICATION NO. : 11/792694
DATED : November 3, 2009
INVENTOR(S) : Tetsuya Abe It is certified that error appears in the above-identified patent and that said Letters Patent is hereby corrected as shown below:

Title page Item (86) should read
(86) PCT No.: ~~PCT/JP2006/001904~~ PCT/JP2006/301904

Signed and Sealed this

Fifth Day of January, 2010

David J. Kappos
*Director of the United States Patent and Trademark Office*